US005510686A

United States Patent [19]

Collier

[11] Patent Number: 5,510,686

[45] Date of Patent: Apr. 23, 1996

[54] AUTOMATED GARAGE DOOR CLOSER

[75] Inventor: James A. Collier, Littleton, Colo.

[73] Assignee: Courtney E. Collier, Littleton, Colo.

[21] Appl. No.: 183,977

[22] Filed: Jan. 21, 1994

[51] Int. Cl.[6] .................................................... H02P 1/04

[52] U.S. Cl. ........................................ 318/446; 318/452

[58] Field of Search ......................... 318/452, 467–469, 318/484, 487, 446; 340/825.69

[56] References Cited

U.S. PATENT DOCUMENTS

| | | | |
|---|---|---|---|
| 4,035,702 | 7/1977 | Pettersen et al. | 318/467 X |
| 4,037,201 | 7/1977 | Willmott | 340/825.69 X |
| 4,364,003 | 12/1982 | Phipps | 318/467 |
| 4,463,292 | 7/1984 | Engelmann et al. | 318/467 |
| 4,538,661 | 9/1985 | Henry et al. | 160/35 |
| 4,542,383 | 9/1985 | Cusey et al. | 343/903 |
| 4,597,428 | 7/1986 | Iha | 160/188 |
| 4,653,565 | 3/1987 | Iha et al. | 160/193 |
| 4,750,118 | 6/1988 | Heitschel et al. | 340/825.69 X |
| 4,771,218 | 9/1988 | McGee | 318/16 |
| 4,806,930 | 2/1989 | Wojciak, Jr. | 340/825.69 |
| 5,027,553 | 7/1991 | Vergara | 49/30 |
| 5,247,232 | 9/1993 | Lin | 318/468 |

*Primary Examiner*—Brian Sircus

[57] ABSTRACT

A security timer, add-on device, for an automated, electrically-powered, garage door causes the door to close after it has been opened for predetermined time, e.g., four and a half minutes. The security timer consists of a relay, two micro switches, bell wire, and electrical wire. The relay, in parallel with the electric light, which is controlled by the automatic electric garage door opener, is thus energized, i.e., the points are opened, when the light is energized. Thus, the normally closed (N/C) relay opens and remains open while the light is lit. The first micro switch (M/S), normally opened (N/O), is in series with the relay, and is attached to one of the points of the relay, the other end, of the M/S, is attached to a push-button wall switch, which can also be used to control the garage door openings or closings. This M/S has a whisker which comes in contact with the door when it is fully open; thereby closing the M/S. If the first M/S is closed while the relay is closed, then this will cause the garage door opener to close the door. This is equivalent to pushing the button, on the garage wall, to close the door. Since reversing operation is required, in case of obstructions, etc., in the path of the closing door; this security timer will not interfere with the reversing safety feature since the door must be in the fully opened position for the M/S to be activated, i.e., the whisker to make contact. The optional second M/S, which could be an ordinary push-button switch, is in parallel with the first M/S in order to provide deactivation of the first when it is desired that the door remain open, i.e., deactivation of the automatic closing feature, or to effectively close the first M/S. The particular garage door opening system depicted in this application also has an open door indicator light option, installed inside of the house. Thus, this device will prevent the garage door from being inadvertently left opened, or if accidentally opened by stray radiation, e.g., from aircraft or a neighbor's transmitter, automatically closed.

5 Claims, 20 Drawing Sheets

AUTOMATED GARAGE DOOR CLOSER

This application comprises an improvement on application Ser. No. 758,822, filed Jul. 25, 1985, U.S. Pat. No. 4,653,565, in which the inventor(s) is Kiyoshi Iha and Susanne Henry assigned to Chamberlain Manufacturing Corp.

BACKGROUND OF THE INVENTION

This invention relates to a device, for use with a conventional automatic garage door opener system (GDOS), which will cause the door to close automatically after a specified time delay.

A conventional GDOS requires a signal to be sent to the motor which raises or lowers the door. The signal is sent either by an electromagnetic transmitter to a receiver in the GDOS which in turn controls the motor, or by an electric push-button, or manual switch, wired to the motor controller.

Because of required safety features, e.g., a reversing system so that the garage door will not continue downward when an object, e.g., a child running into the garage, is detected in the path of the descending door; modifications to existing and redesign of future GDOS is required. Consequently, any proposed modification to existing designs must meet this condition.

Users of the GDOS sometimes forget to send the required signal to close the door after it has been opened. Sometimes, transmitters, e.g., those of neighbors' or stray aircraft, operating within the bandwidth of the receiver of the GDOS will cause the door to be opened. If the owner is not at home, or is not aware that this has occurred, the garage is left opened, sometimes for hours. This could cause loss due to theft, weather damage, or injuries to neighborhood children playing in the garage without authorization from the owner.

This invention relates to a device attachable to a conventional GDOS for automatically closing the door and which would not interfere with the required reversing safety feature. The device includes a time delay which would provide the driver adequate time to exit the vehicle and to override, if desired this device, and does not affect any other normal operation, e.g. the use of the transmitter, or the push-button, to control the garage door.

SUMMARY OF THE INVENTION

In the preferred embodiment, a security timer, an add-on device, for an automated, electrically-powered, garage door causes the door to close after it has been opened for predetermined time, e.g., four and a half minutes. The security timer consists of a relay, two micro switches, bell wire, and electrical wire. The relay, in parallel with the electric light, which is controlled by the automatic electric garage door opener, is thus energized, i.e., the points are opened, when the light is energized. Thus, the normally closed (N/C) relay opens and remains open while the light is lit. The first micro switch (M/S), normally opened (N/O), is in series with the relay, and is attached to one of the points of the relay, the other end, of the M/S, is attached to a push-button wall switch, which can also be used to control the garage door openings or closings. This M/S has a whisker which is in contact with the door when it is fully opened; thereby closing the M/S. If the first M/S is opened and the relay is closed, then the garage door opener closes the door. This is equivalent to pushing the push-button to close the door. This security timer will not interfere with the reversing safety feature since the door must be in the fully opened position for the M/S to be activated, i.e., the whisker to make contact. The light is part of the automatic garage door opening system via the light circuit, in parallel, to which the relay is attached. Thus, this device will prevent the garage door from being inadvertently left opened, or if accidentally opened by stray radiation, e.g., from aircraft or a neighbor's transmitter, automatically closed.

DESCRIPTION OF PREFERRED EMBODIMENT

Figure 1:
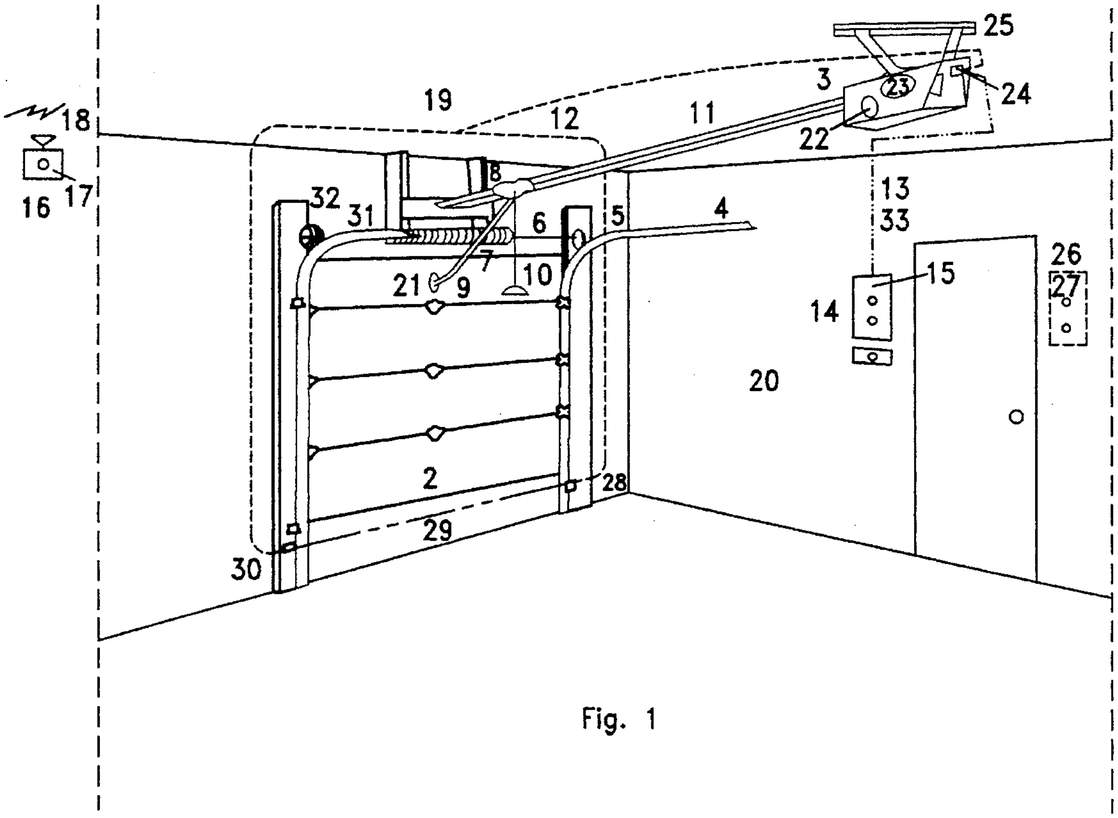
FIG. 1 is a perspective view of a garage door opening system (GDOS).

A garage door opening system (GDOS) 1 is shown in FIG. 1. Door 2 is mounted on tracks 4 and 4' so that it can be moved vertically to a fully opened position and is above the garage floor. The door is raised via a reversible motor 23 housed in the door opener 3 which is mounted on the ceiling 19 with bracket 25. The motor moves a chain connected to a trolley 8. The trolley rides a rail 11. The trolley has a release cord 10 and a hinged lever arm 9 which is attached to the door by means of a bracket 21. Thus, the motor moves the chain which moves the trolley thereby raising or lowering the door. The shaft 6, rotatably mounted above the door, has a conventional counterweight spring 7, to counterbalance the weight of the door, and pulleys 5 and 5'.

Figure 3:
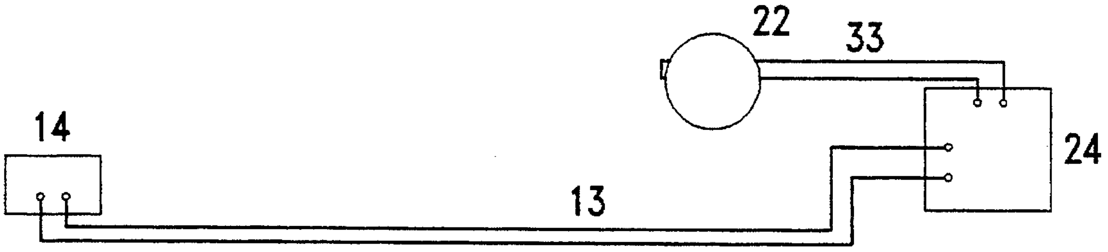
FIG. 3 provides a top level electrical diagram view of the unmodified GDOS electrical circuit.

The motor can be actuated either by a the remote transmitter button 17 or via a push-button 15 on a wall switch 14. The electrical circuit for the push-button, and the logic board 24 containing the light circuit, are shown in FIG. 3'. The radio signal 18 from the transmitter is detected by the GDOS receiver, decoded, and triggers the actuation of the door opener motor. The ceiling light 22 is simultaneously energized, illuminating the garage. An infrared (IR) sensor(s) 28 (28') system, connected to the door opener, has a beam 29 which provides obstruction detection, i.e. detects the presence of an obstruction in the path of the door if the door is in motion. If motion is detected, i.e., the beam is broken, then the sensor system sends a signal to the door opener control panel via connections 12 depicted in FIG. 1. This causes the motor to reverse, if it is lowering the door, and return the door to its fully opened position. A door open indicator 26 light may be installed inside of the house.

Figure 2:
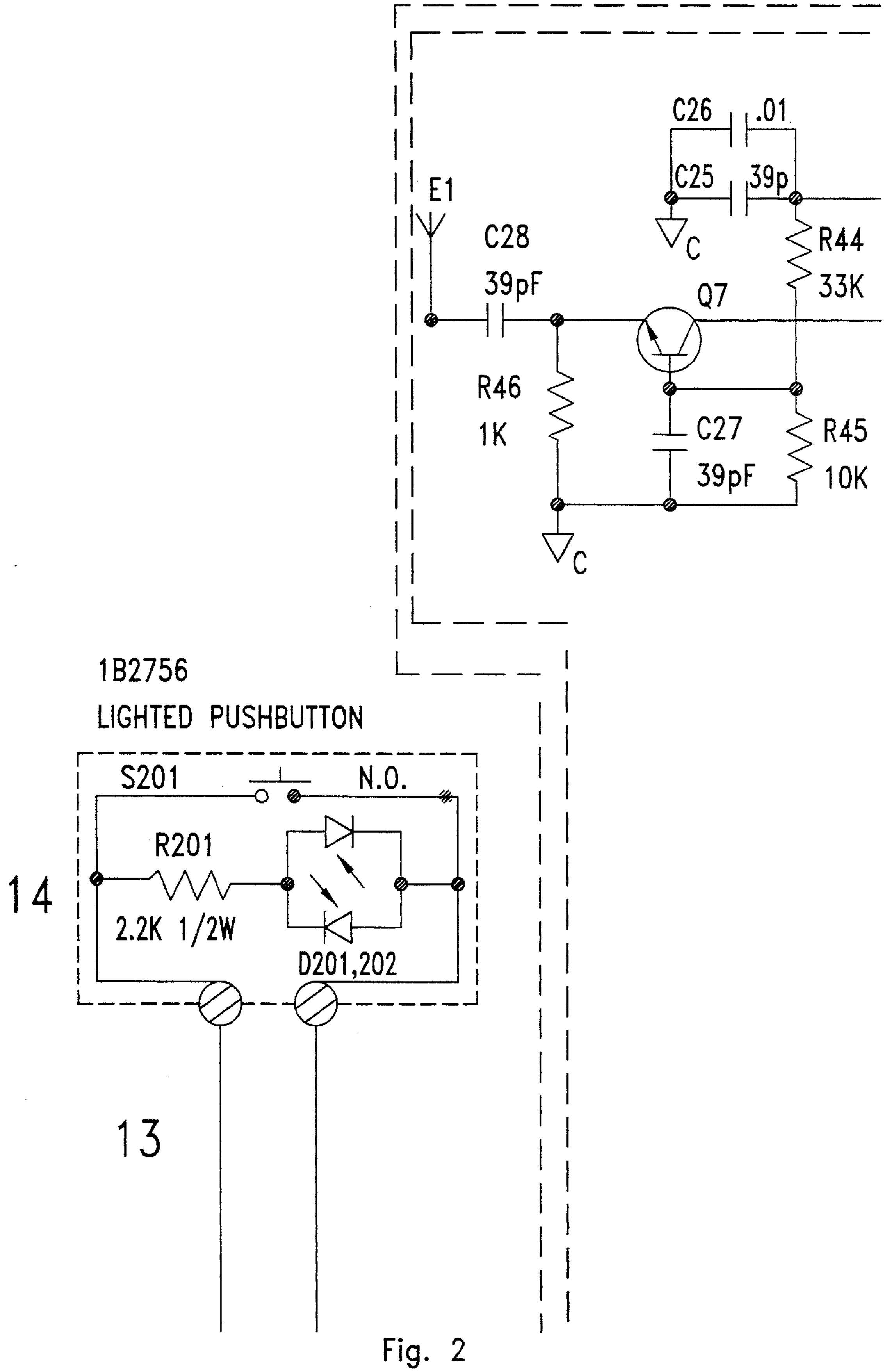
FIGS. 2, 2A–2G are electrical schematics for the unmodified GDOS.
Figure 2A:
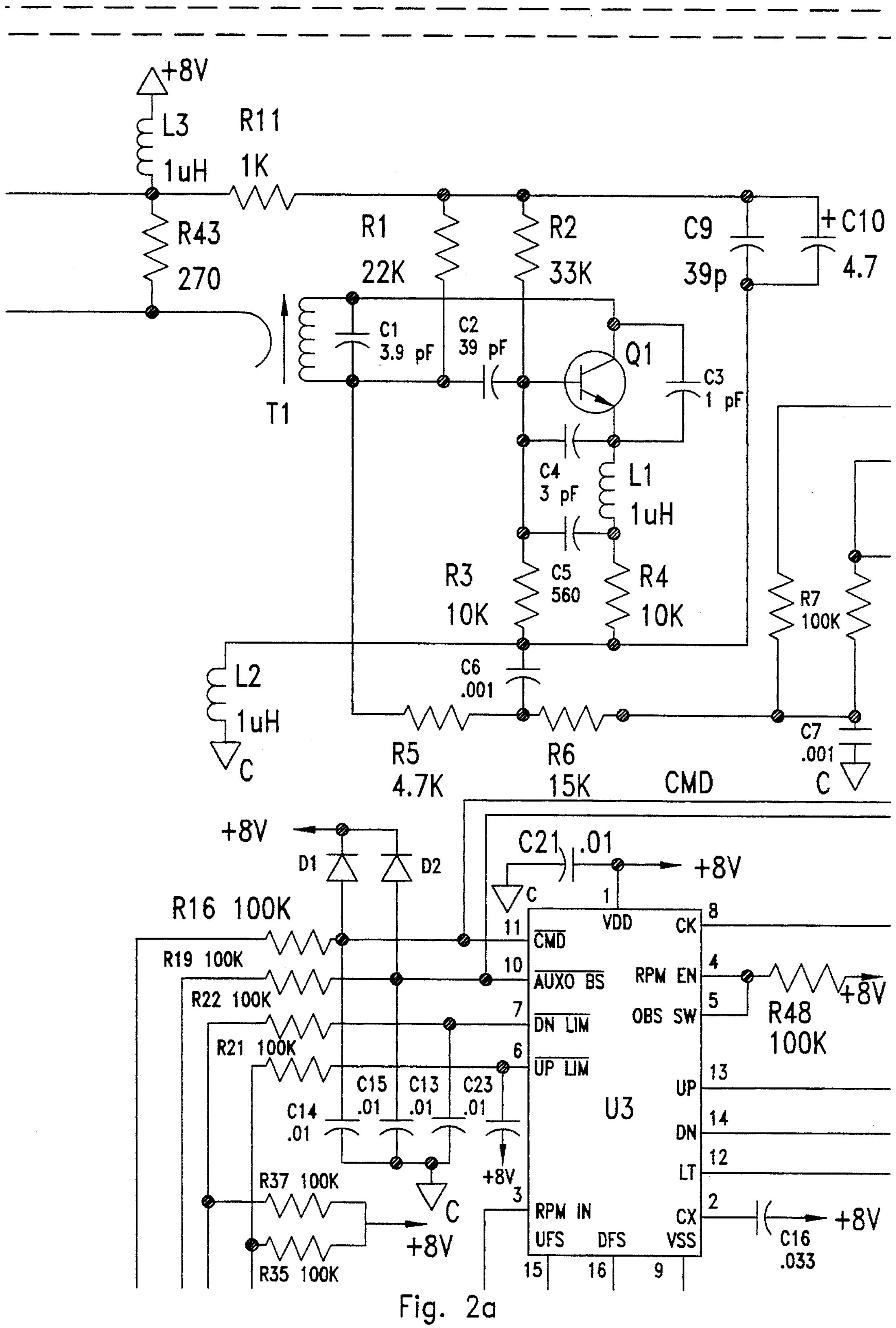
Figure 2B:
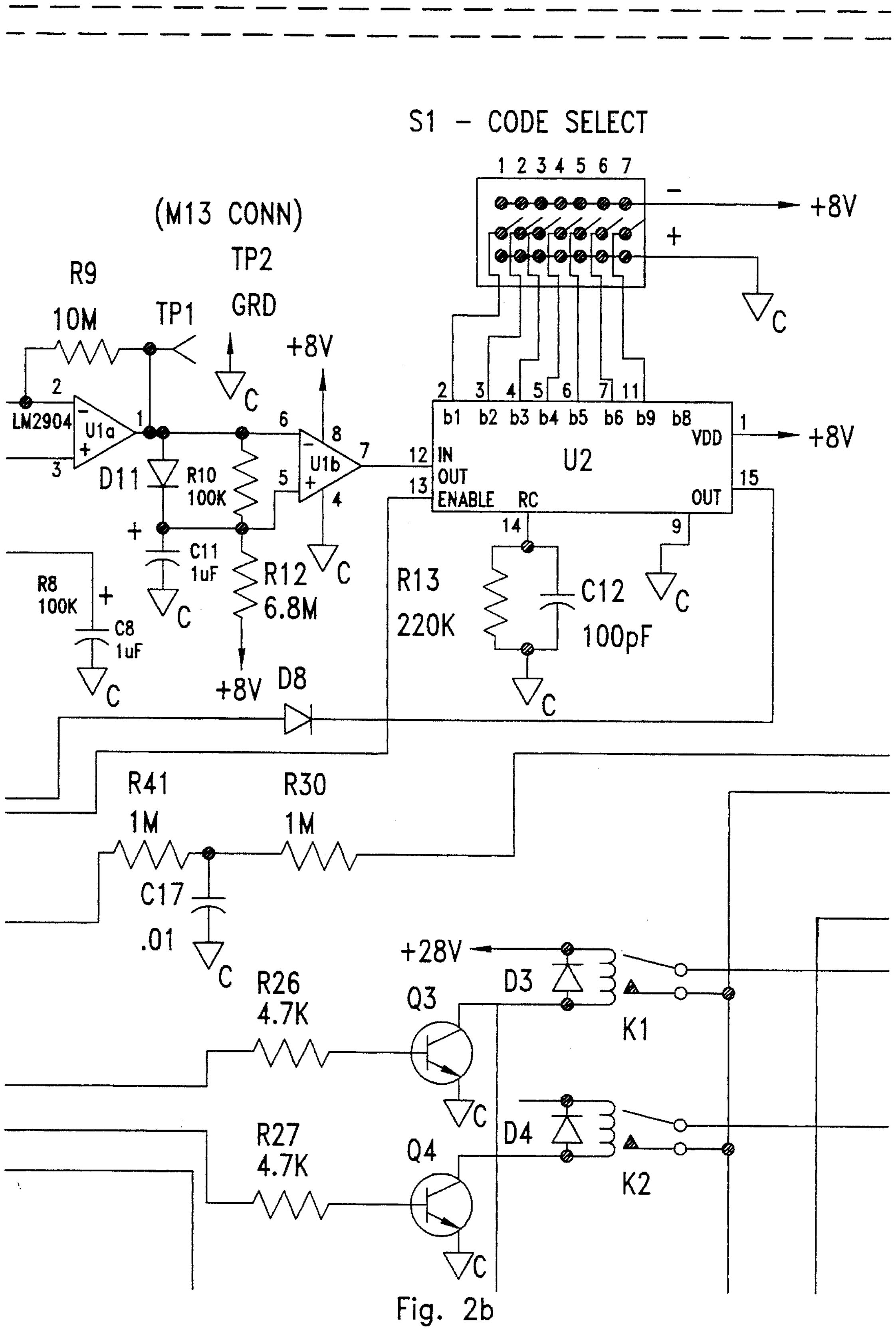
Figure 2C:
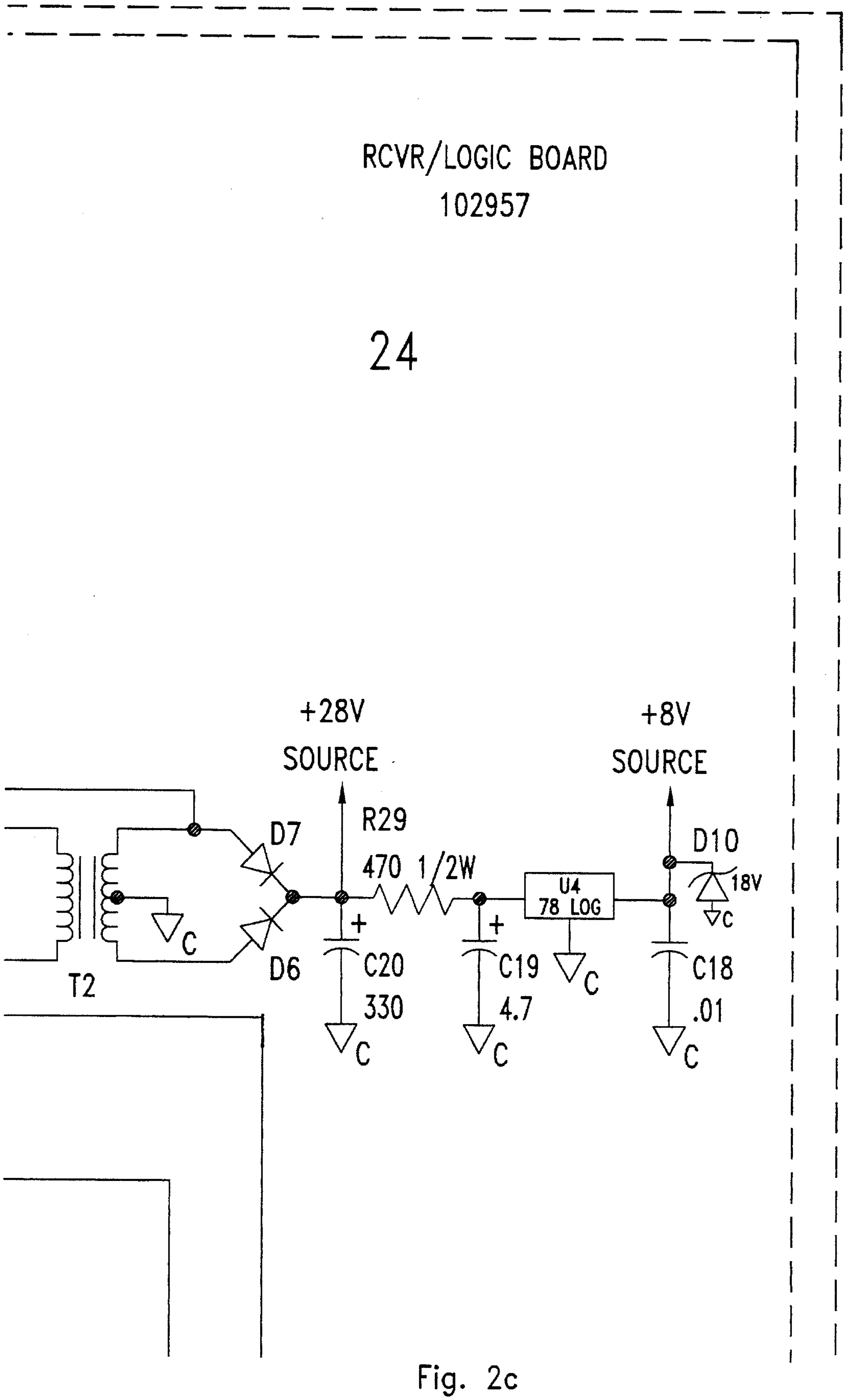
Figure 2D:
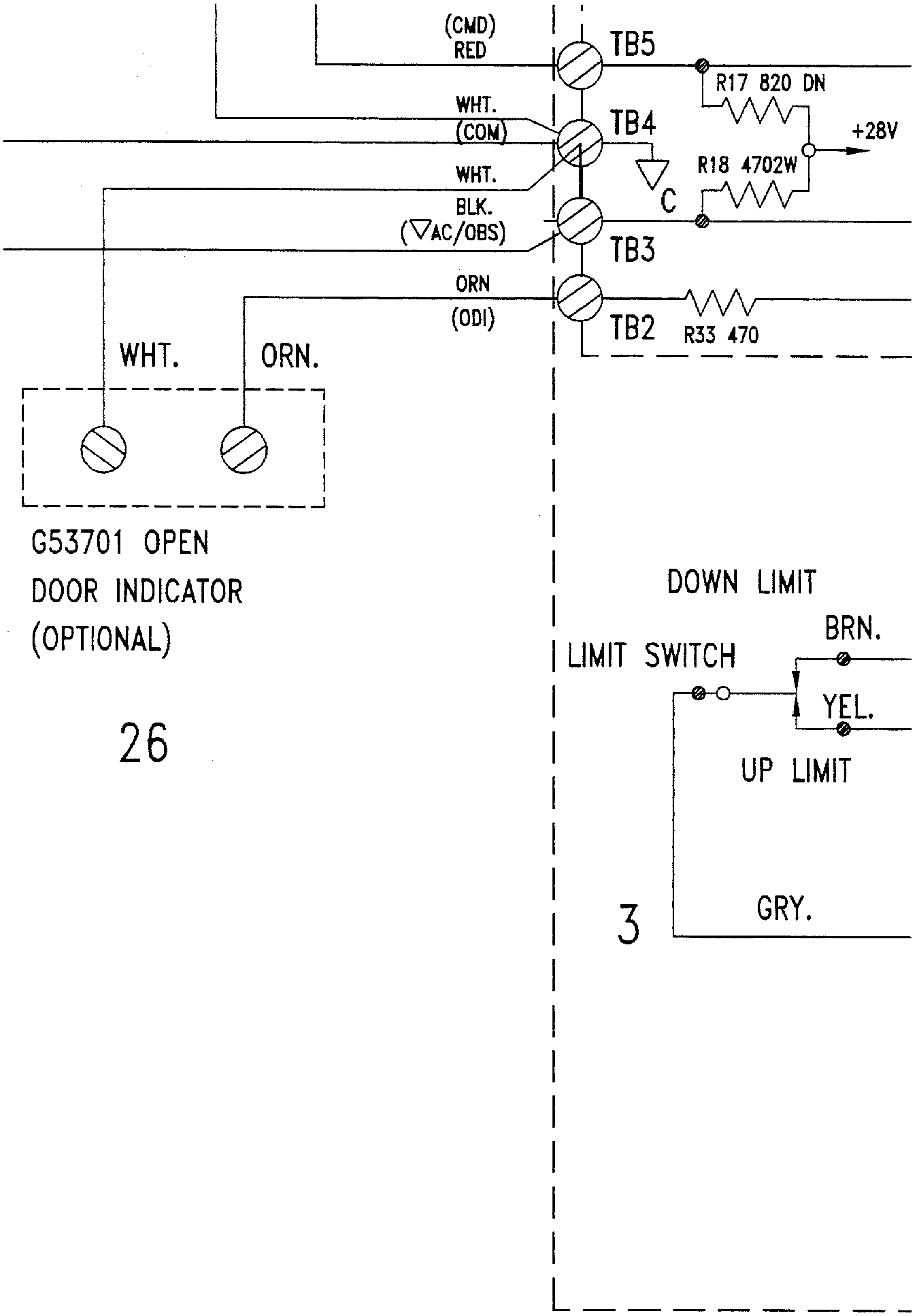
Figure 2E:
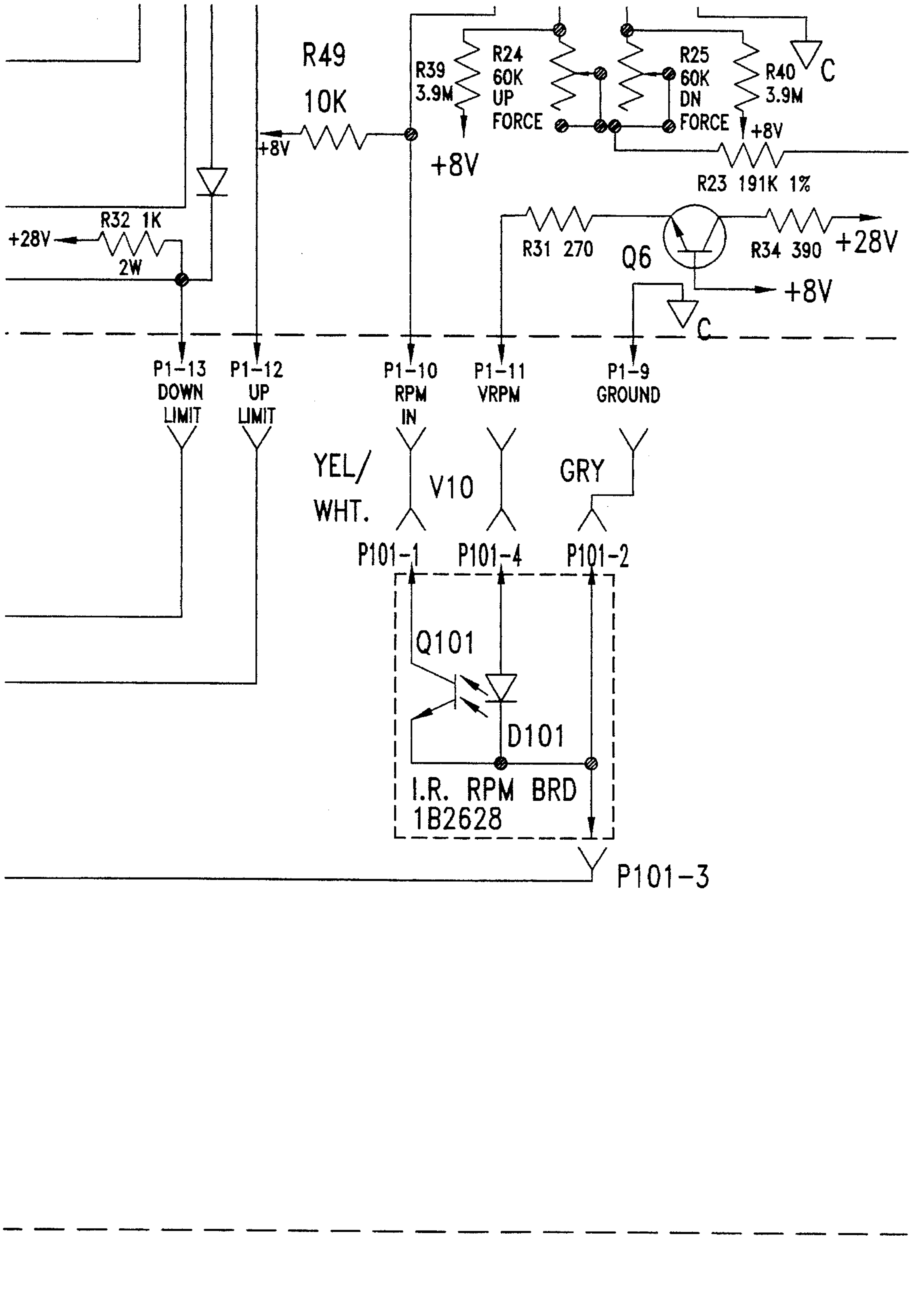
Figure 2F:
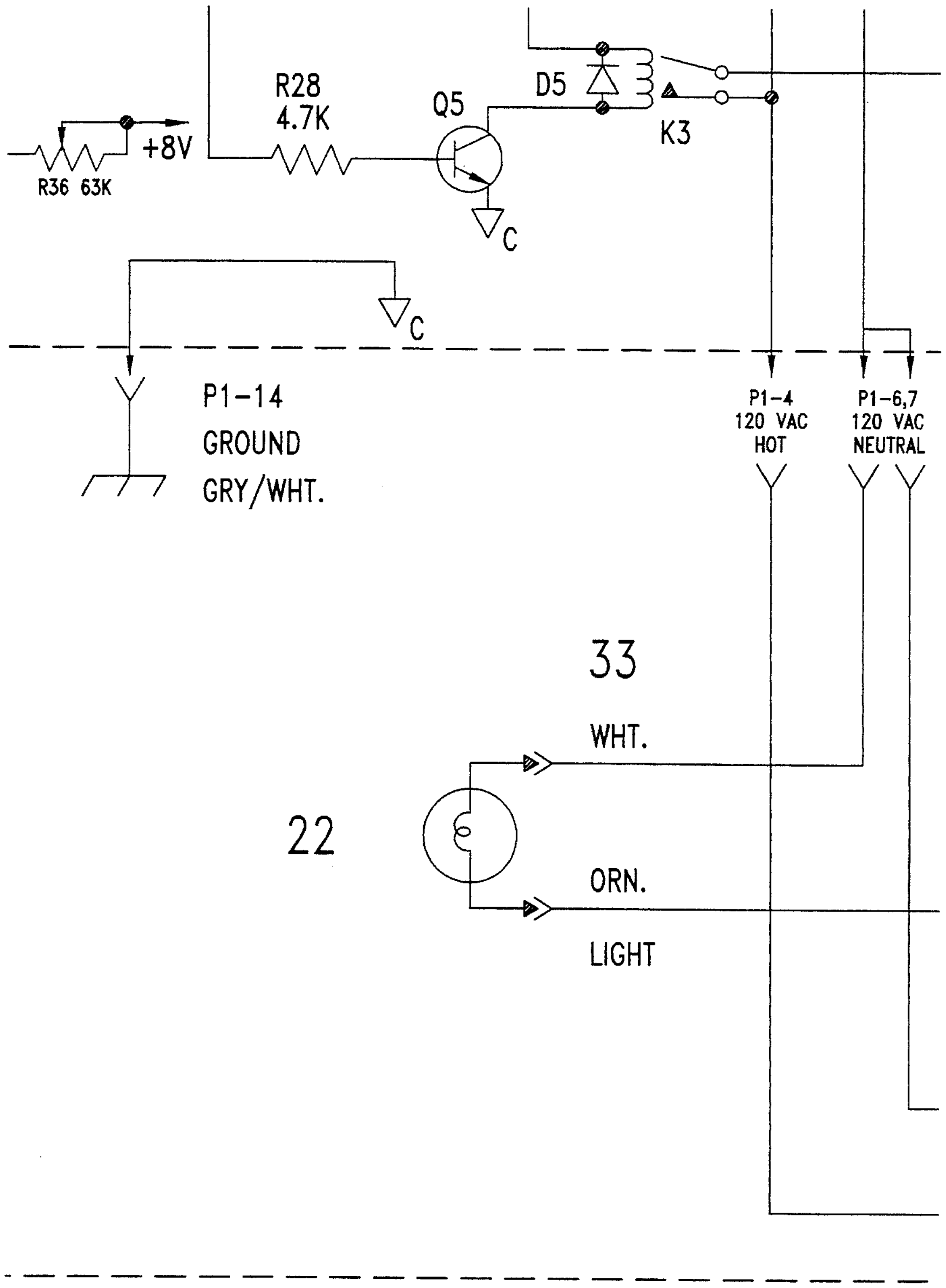
Figure 2G:
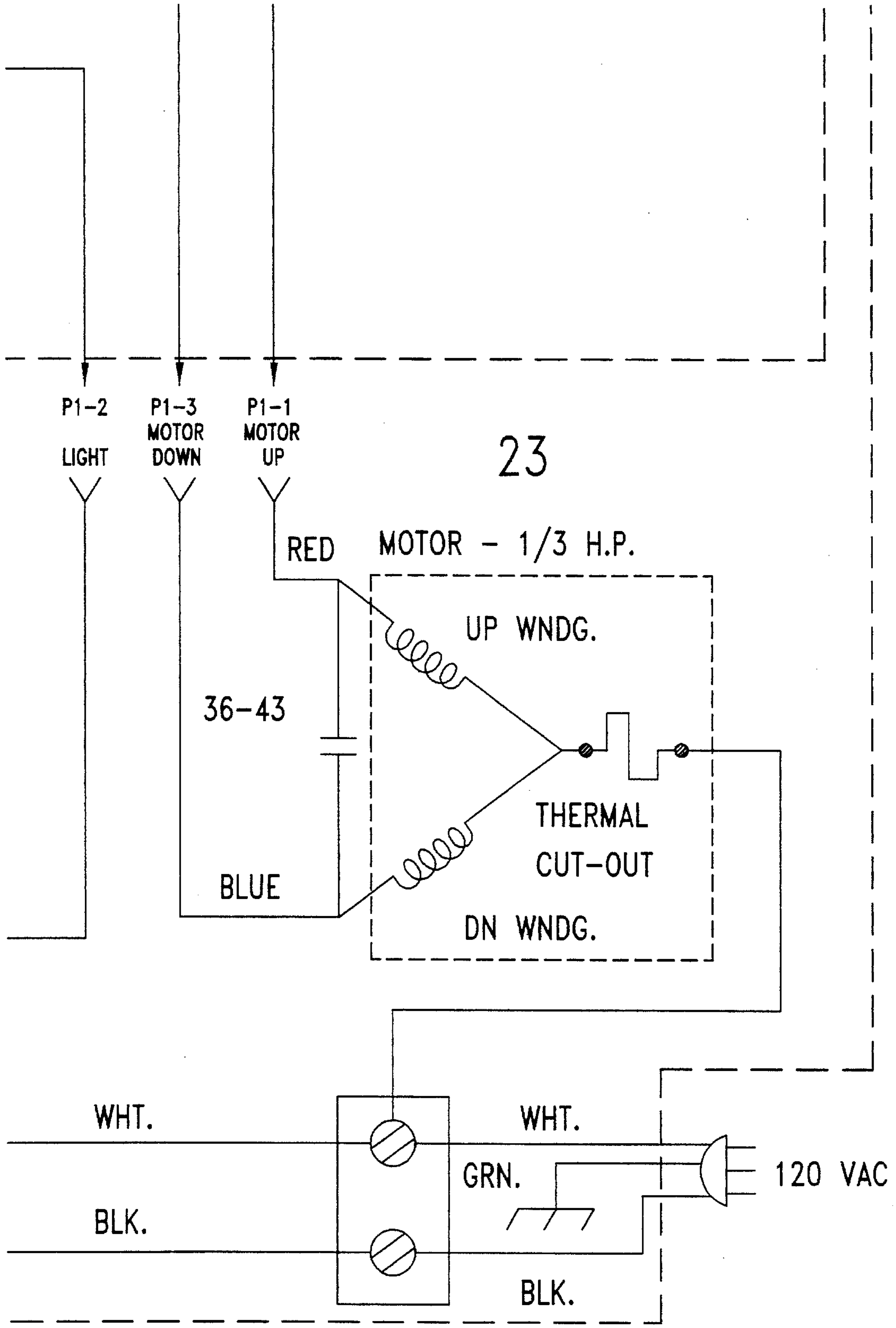
Figure 4:
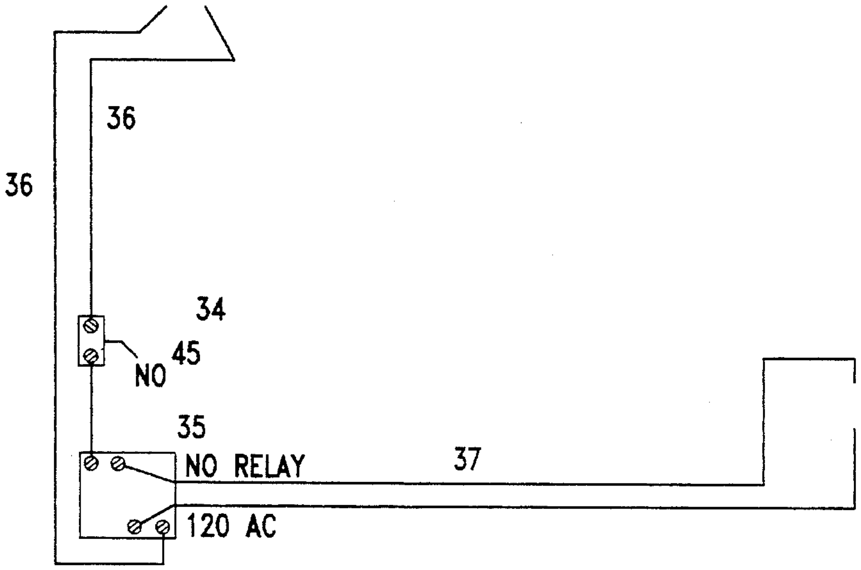
FIG. 4 is a design of the proposed automatic closing device.

The electric schematic of the garage door opener operator depicts the reversible, electric motor 23, the logic board 24, and the light circuit associated with the light 22 FIG. 2. The circuit for the optional door open indicator is also shown. This device, the automatic garage closer, FIG. 4 consists of a relay 31, micro switch 30, with a whisker 36, 14 AWS wire 33, and bell wire 32.

Figure 5:
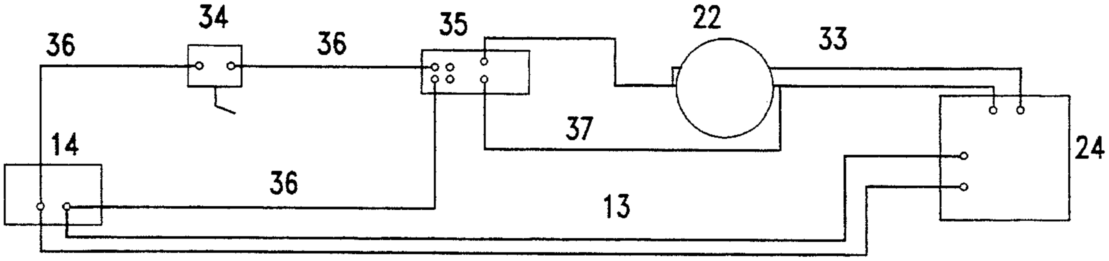
FIG. 5 shows a modification of the electrical circuit due to an additional micro switch and an over ride switch.
Figure 6:
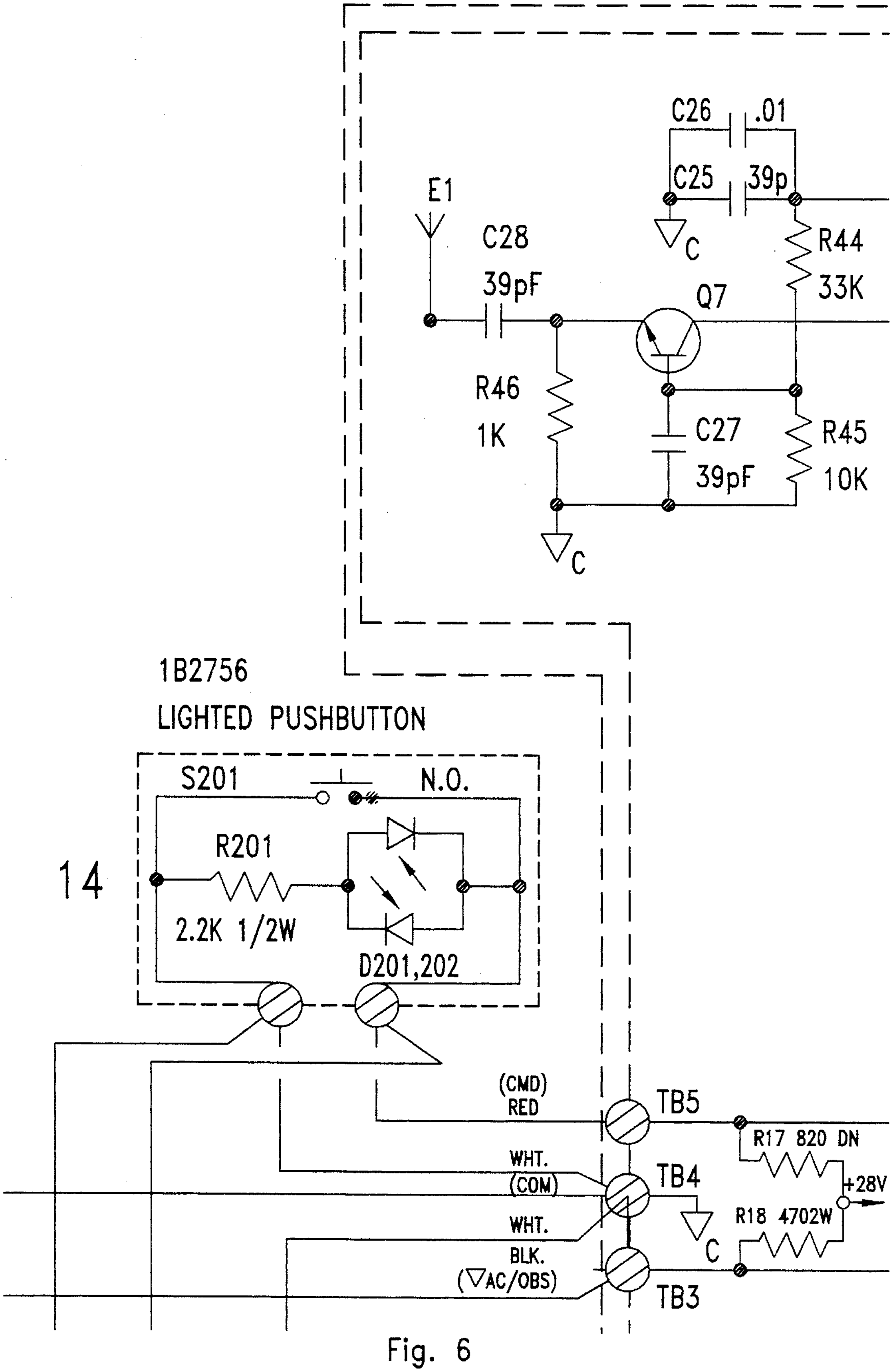
FIGS. 6, 6A–6G shows a schematic of the modified GDOS with the inclusion of the proposed automatic closing device.
Figure 6A:
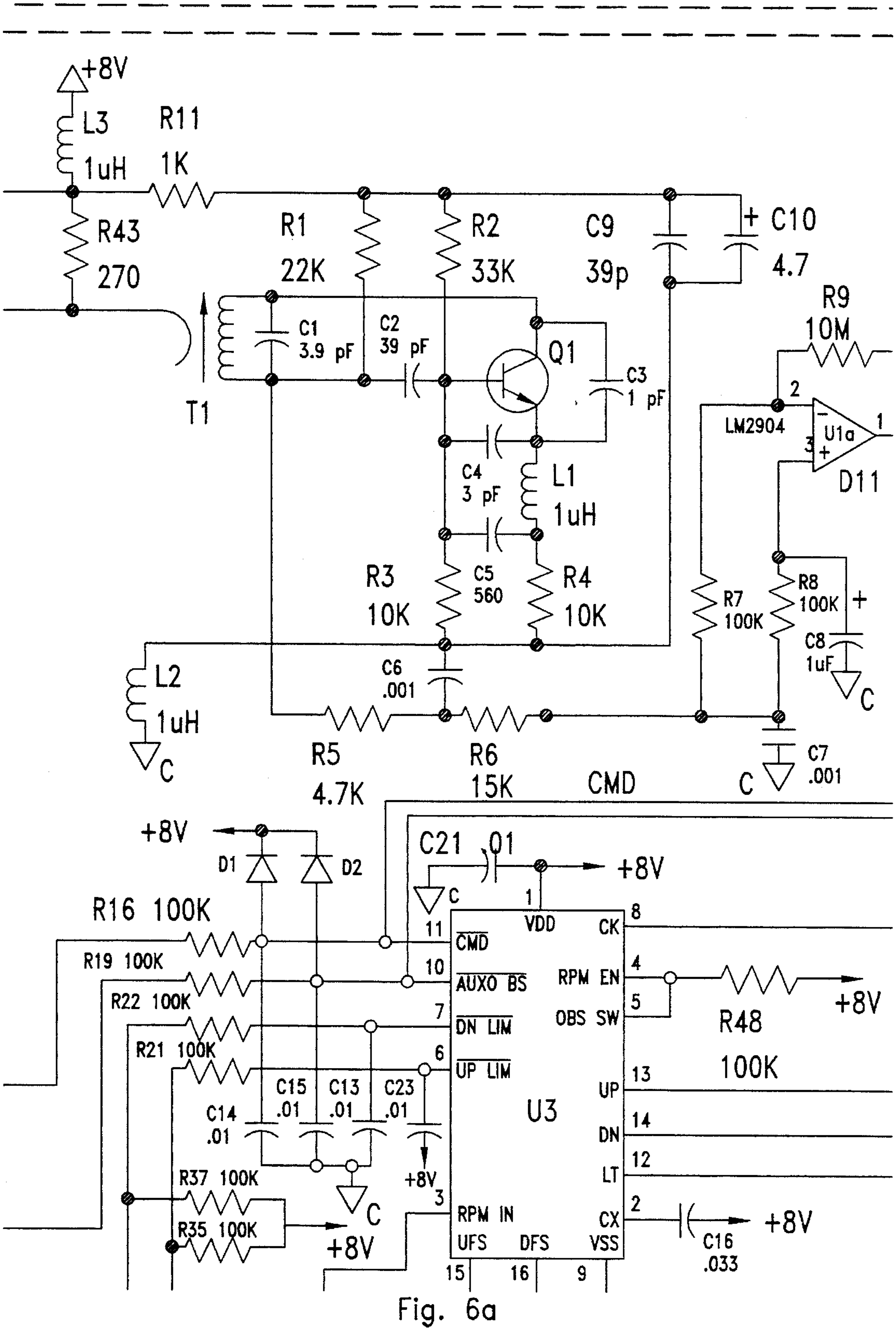
Figure 6B:
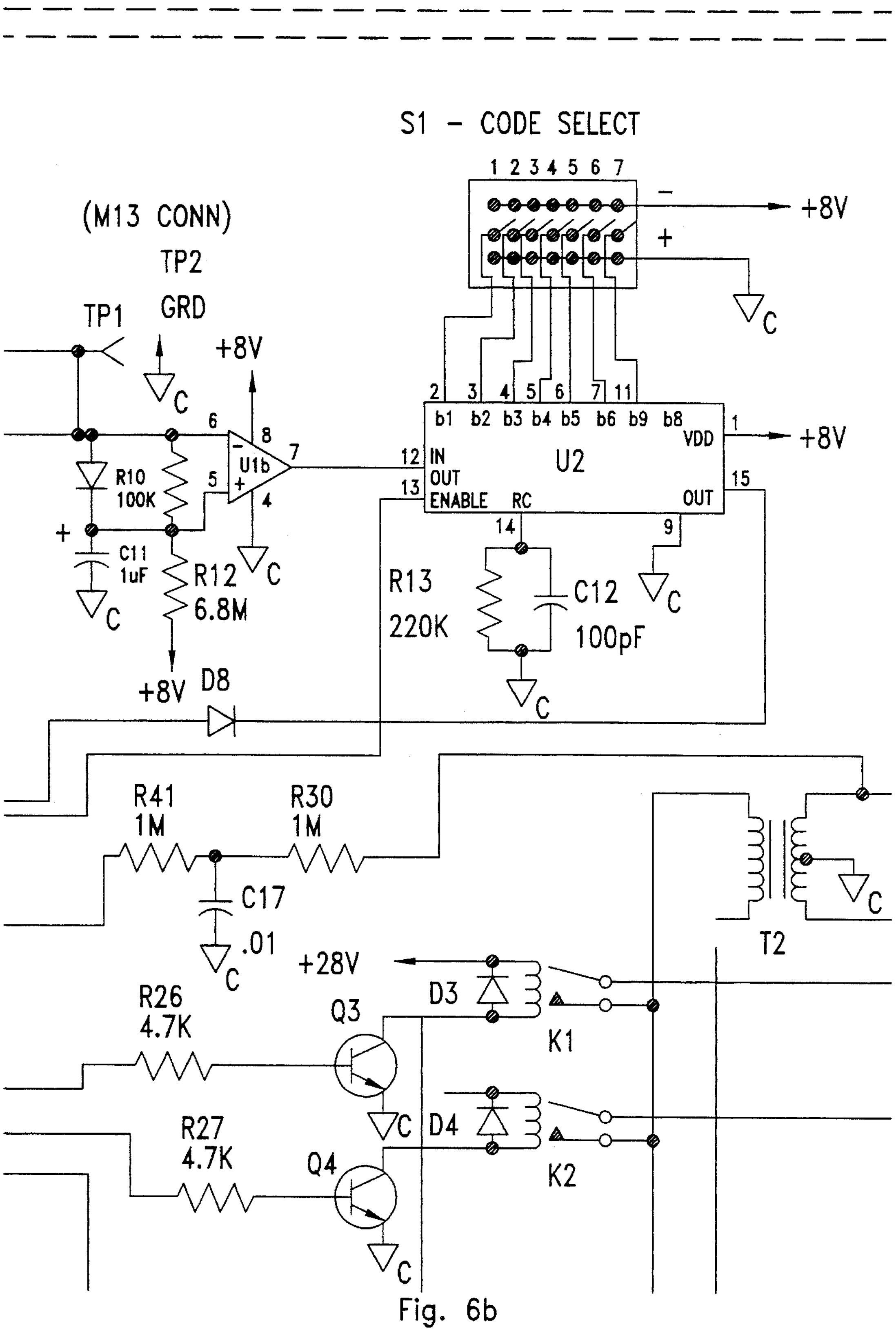
Figure 6C:
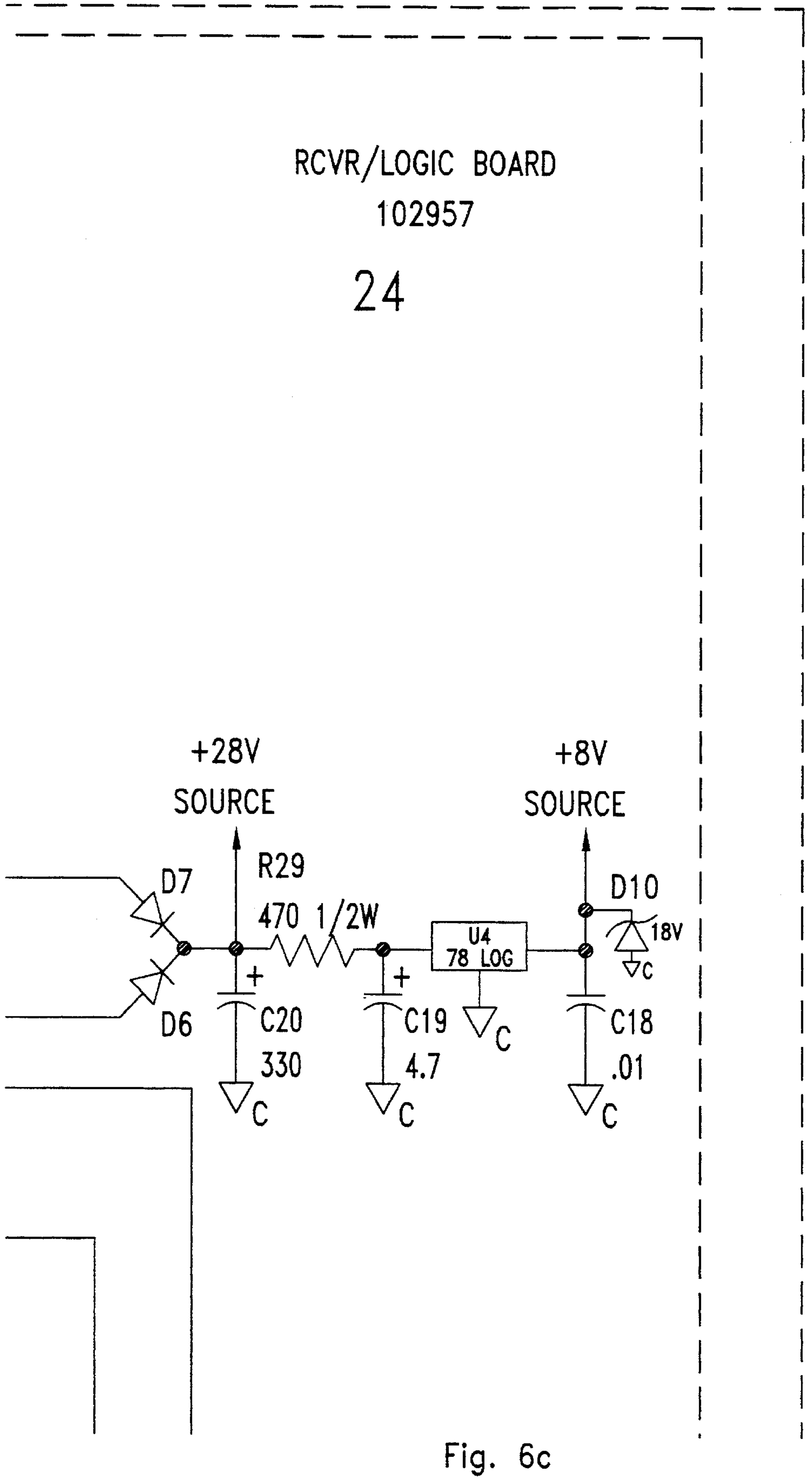
Figure 6D:
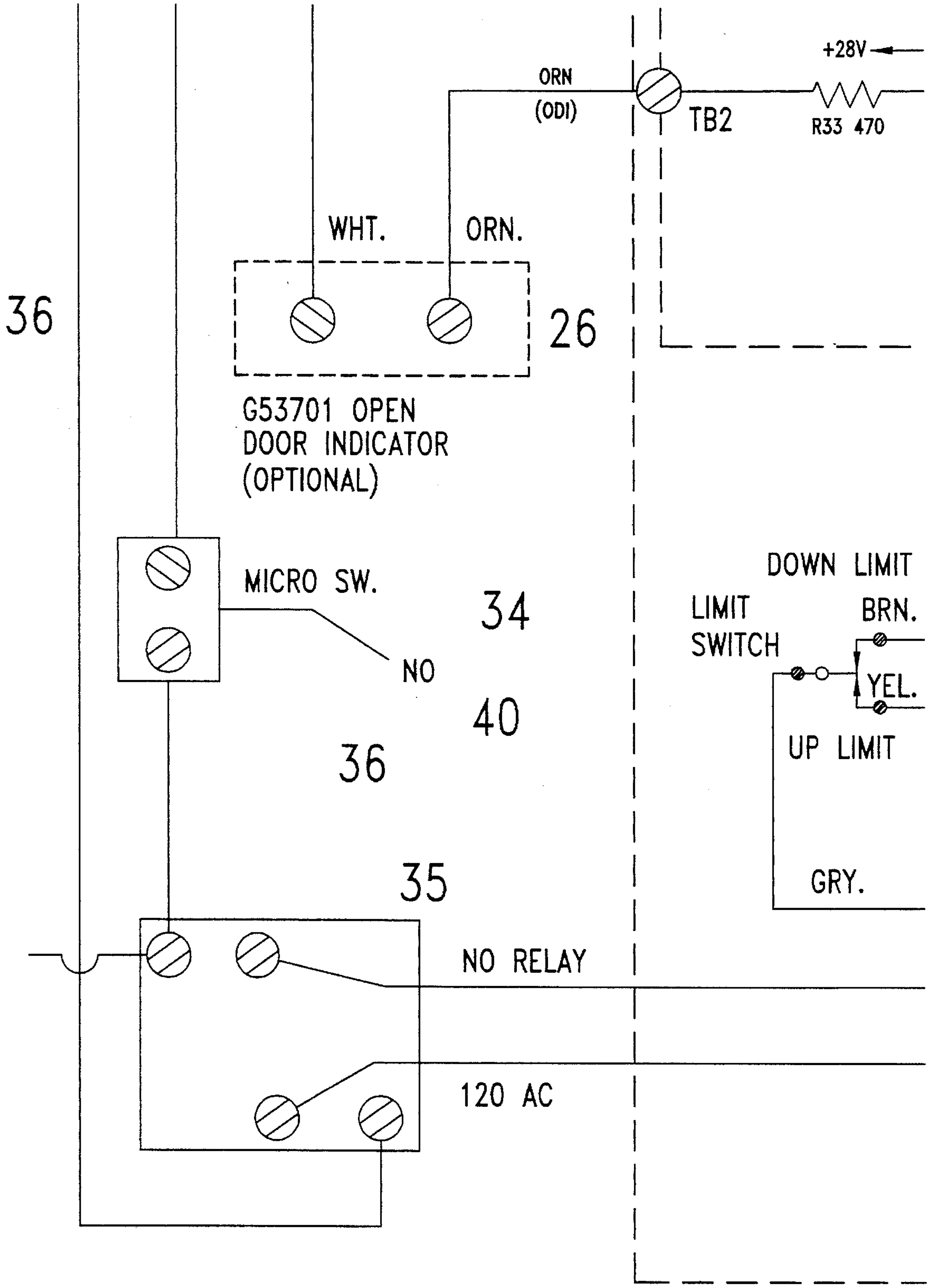
Figure 6E:
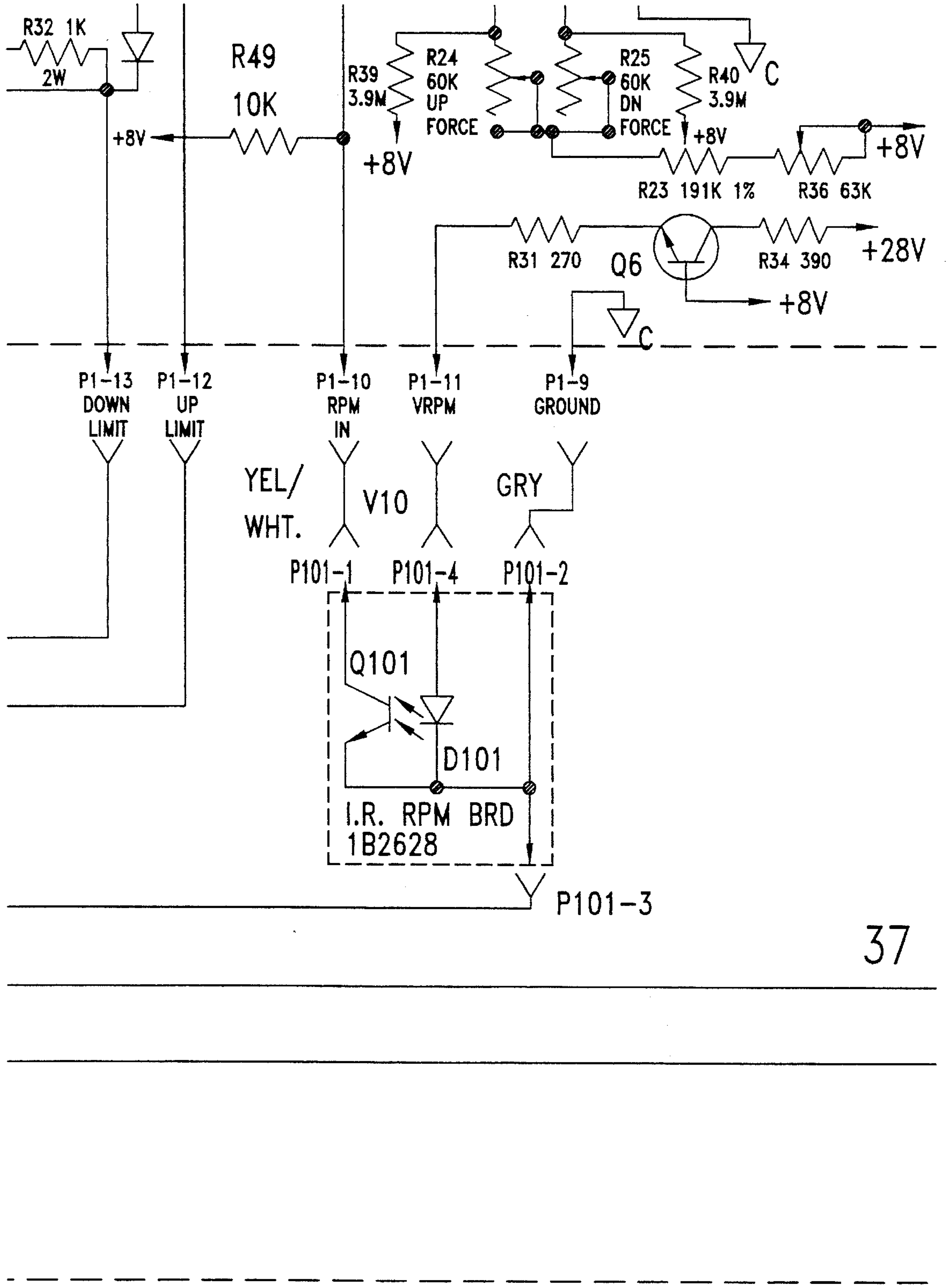
Figure 6F:
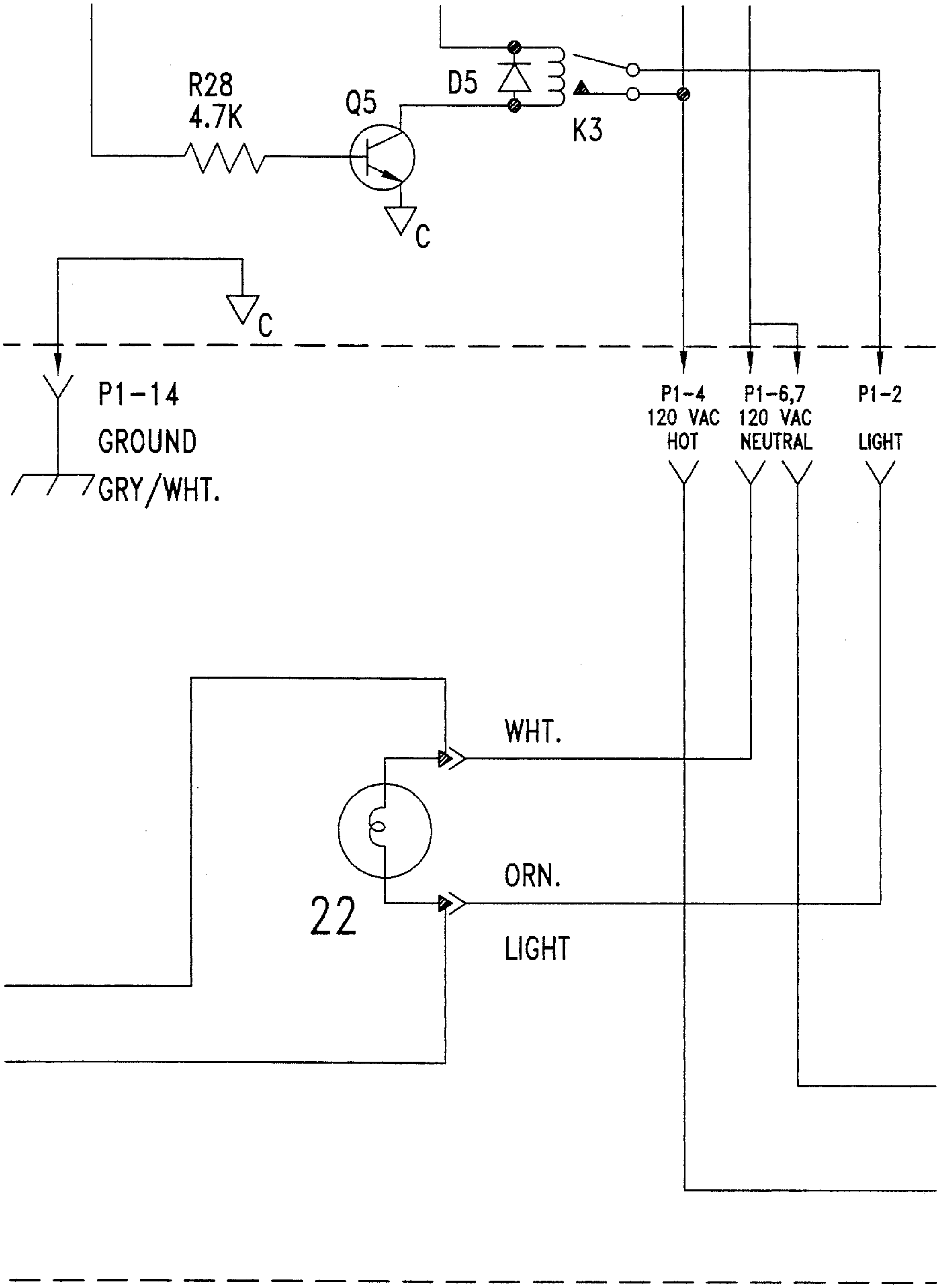
Figure 6G:
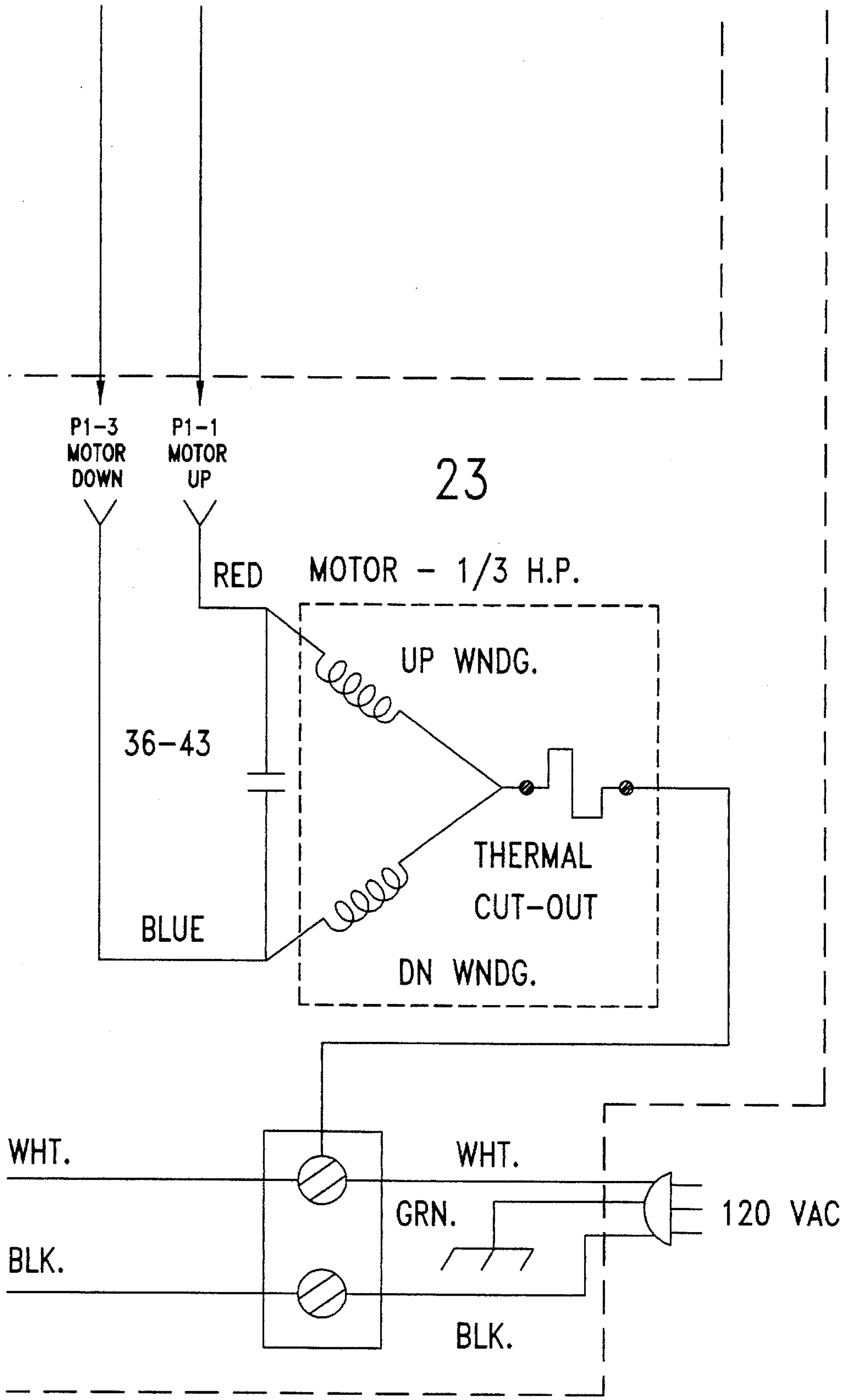

FIGS. 5 and 6 shows the new electrical circuit with said device installed. The reversing feature of the GDOS is not disturbed since once the door is no longer in its fully opened position, said device is deactivated, since the whisker is no longer in contact with the door.

Figure 7:
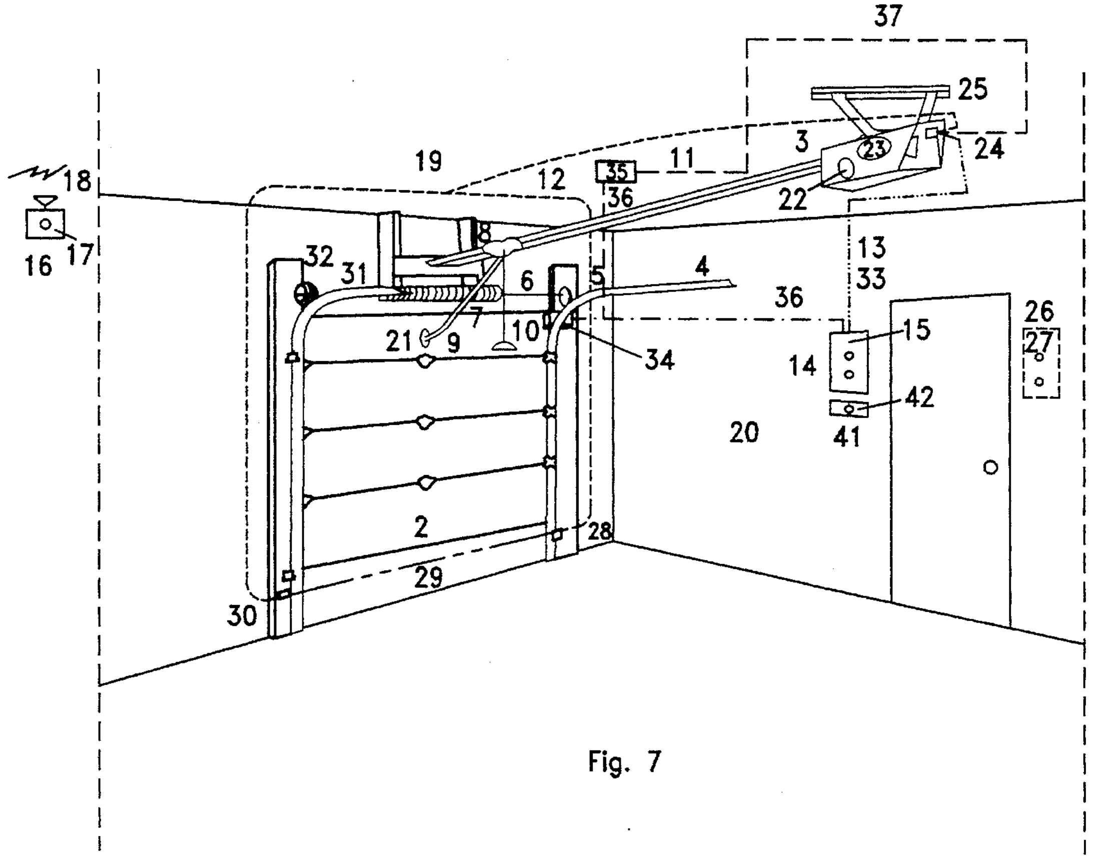
FIG. 7 is a perspective view of the garage door opening system with the automatic closing device shown.

The installed device is depicted in FIG. 7. The micro switch (M/S) 18 is positioned on the frame of the garage door, near the track, so that it's whisker makes contact with the door when it is in its fully opened position. The M/S is normally opened (NO). A bell wire 32 connects the M/S, in series, with one point of the relay 19 and with one terminal of the existing push-button, or wall switch 14 of the GDOS. Another piece of bell wire 32 connects the other point of the relay 31 to the other terminal of the existing push-button 14, placing the relay in parallel with the push-button.

The relay 31 is mounted on the wall 20 of the garage. A piece of 14 AWS gauge electrical wire 33 connects the relay, in parallel with the light 22, i.e. the light circuit 24 of the existing garage door opening system (GDOS). The time delay circuit is part of the GDOS. It activates the light by means of a time delay current flow across said time delay circuit terminals, and now, simultaneously, the relay of said device, and in conjunction with the closing of the M/S of said device, acts as a trigger to cause the garage door opener to return the door to its original position, i.e., closed.

The optional second M/S 34, which could be an ordinary push-button switch, is in parallel with the first M/S in order to provide deactivation of the first when it is desired that the door remain open, i.e., deactivation of the automatic closing feature, or to effectively close the first M/S.

The device of the invention is designed as a low-cost add-on for a range of automatic, motorized, garage door opening systems. Wires 32 and 33 are the only electrical connections required so that with the relay and micro switch they provide a simple but effective device. Consequently, the device may be added to any existing system which contains a light circuit which is activated when the garage door is opened. The wiring of the existing system does not need to be disturbed, nor is the existing operation via the transmitter or the push-button disturbed.

Thus there has been shown and described a novel garage door closing apparatus which fulfills all of the objectives and advantages sought therefor. Many changes, modifications, and other uses and applications of the subject invention will, however, become apparent to those skilled in the art after considering this specification together with the accompanying drawings and claims. All such changes, modifications, variations and other uses and applications which do not depart from the spirit and the scope of the invention are deemed to be covered by the invention which is limited only by the claims which follow.

The inventor claims:

1. In combination a garage, an electronic garage door apparatus and an automatic closing means, the garage comprising:

at least one wall, a garage door frame, an over head garage door movable between an open position and a closed position;

the electric garage door apparatus comprising:

a motorized unit for alternately opening and closing the garage door in response to a start signal, a push button switch for providing the start signal to the motorized unit, a timer for providing a time delay after operation of the push button switch, a light circuit responsive to an output of the timer for providing light during the time delay, the automatic closing means for closing the garage door comprising:

a first switch located on the garage door frame so that when the garage door is in the open position the first switch is switched closed, a relay located on the wall, first and second wires connecting the relay in parallel with the light circuit, said first and second wires are 14 AWS gauge electric wire, first bell wire connecting the relay to the first switch, second bell wire connecting the first switch to the push button switch so that the first switch is in series between the relay and the push button switch, third bell wire connecting the relay to the push button switch so that the relay is in parallel with the push button switch, whereby termination of operation of the light circuit at the end of the time delay causes the relay to close and if the first switch is closed, indicating the garage door is open, providing the start signal to the motorized unit.

2. The combination according to claim 1 wherein the first switch is a microswitch.

3. The combination according to claim 1 wherein the automatic closing means further comprises a second switch in series with the first switch and the relay whereby the automatic closing means is disabled when the second switch is opened.

4. The combination according to claim 1 wherein the first switch is a non-contacting proximity detector.

5. The combination according to claim 3 wherein the first switch is a non-contacting proximity detector.

* * * * *